United States Patent

Ripplinger

[15] 3,648,168

[45] Mar. 7, 1972

[54] APPARATUS FOR MEASURING REVERSE RECOVERY CHARACTERISTICS OF DIODES

[72] Inventor: Roland E. Ripplinger, Phoenix, Ariz.

[73] Assignee: Honeywell Information Systems Inc., Waltham, Mass.

[22] Filed: Dec. 16, 1970

[21] Appl. No.: 98,575

[52] U.S. Cl. .................................. 324/158 D, 324/158 T
[51] Int. Cl. ............................................. G01r 31/22
[58] Field of Search ............... 324/158 D, 158 T, 158 R, 73 R

[56] References Cited

UNITED STATES PATENTS 2,999,983   9/1961   Stern et al. ........................ 324/158 D

OTHER PUBLICATIONS

Fink, H. J.; Reverse Recovery...; Solid-State Electronics; Nov. 1964; Vol. 7; pp. 823-831.

Primary Examiner—Rudolph V. Rolinec
Assistant Examiner—Ernest F. Karlsen
Attorney—Fred Jacob and Edward W. Hughes

[57] ABSTRACT

The apparatus uses a solid-state circuit in measuring reverse recovery time of diodes used in high-frequency power supplies. The circuit disclosed eliminates the oscillations and other spurious signals, which are often developed by prior art testing apparatus, and requires a single power supply. The duration and amplitude of forward current in the diode being tested can be accurately controlled by a transistor connected in series with the diode.

7 Claims, 2 Drawing Figures

Patented March 7, 1972

3,648,168

INVENTOR.
ROLAND E. RIPPLINGER
BY Lloyd B. Guernsey
AGENT 3,648,168

APPARATUS FOR MEASURING REVERSE RECOVERY CHARACTERISTICS OF DIODES

BACKGROUND OF THE INVENTION

The present invention pertains to apparatus for measuring the electrical characteristics of diodes and more particularly to apparatus for measuring the reverse recovery characteristics of diodes which provide relatively large amounts of DC power from an AC supply which provides relatively narrow pulses of current having fast rise and fall times.

Power diodes which are used as rectifiers in power supplies convert an AC voltage from power lines to a DC voltage for use in many types of electronic equipment. The diodes provide a low impedance so that a relatively large current flows from the AC powerline to a DC output terminal on the first half of an AC cycle. The diodes provide a relatively high impedance so that little or no current flows on the second half of the AC cycle. If a diode is defective so that it has a relatively low impedance on the second half of the AC cycle the power losses in the diode will be relatively high and the efficiency of the power supply will be low. Solid state diodes may store electrical charges during the first half of the AC cycle when the impedance is low. These stored charges cause a current to flow on the second half of the cycle so that the power loss in the diode is increased and the efficiency of the power supply is reduced. It is desirable to select diodes which store a minimum of electrical charges so that the efficiency of any power supply in which they are used will be relatively high.

Some power prior art circuits for measuring the amount of these stored charges or for measuring the reverse recovery characteristics of the diodes use a plurality of special power supplies, relays, relay drivers and resistors. Power supplies for use with these prior art circuits must be specially constructed so that they are not affected by transient loads. Such power supplies are expensive and difficult to construct. Also the relays are relatively slow acting so that the reverse recovery characteristics of diodes cannot be measured under typical operating conditions where narrow pulses of current flow through the diodes. The slow-acting relays cause the diodes being tested to conduct electrical current for relatively long periods of time so that the junction temperature of the diodes may change and cause the operating characteristic of the diodes to change. It is desired that relatively large pulses of current having a relatively short time duration be used in checking diodes so that all of the diodes will operate near room temperature and characteristics of each diode can be readily compared with the characteristics of the other diodes.

The instant invention overcomes the disadvantages of the prior art by providing apparatus for measuring reverse recovery characteristics of diodes without requiring special power supplies and without using relays. Since relays are not used in the apparatus disclosed narrow pulses of current having a relatively large amplitude can be used to measure the reverse recovery characteristics of diodes.

It is therefore an object of this invention to provide a new and improved circuit for measuring the reverse recovery characteristics of diodes.

Another object of this invention is to provide a new and improved apparatus for measuring the reverse recovery time of power rectifiers.

Another object of this invention is to provide a new and improved apparatus for measuring the reverse recovery time of power rectifiers employing narrow pulses of current.

Still another object of this invention is to provide a new and improved apparatus for measuring the reverse recovery time of rectifiers employing relatively large pulses of current having a relatively short time duration.

SUMMARY OF THE INVENTION

The foregoing objects are achieved in accordance with one embodiment of the present invention for employing a circuit for measuring reverse recovery characteristics of diodes using a first capacitor and a transistor to supply current in the forward or low-impedance direction to the diode under test. The transistor controls the amplitude and time duration of current in the forward direction. A second capacitor supplies current in the reverse or high-impedance direction to check the reverse recovery characteristic of the diode.

Other objects and advantages of this invention will become apparent from the following description when taken in connection with the accompanying drawings.

DESCRIPTION OF THE PREFERRED EMBODIMENT

Figure 1:
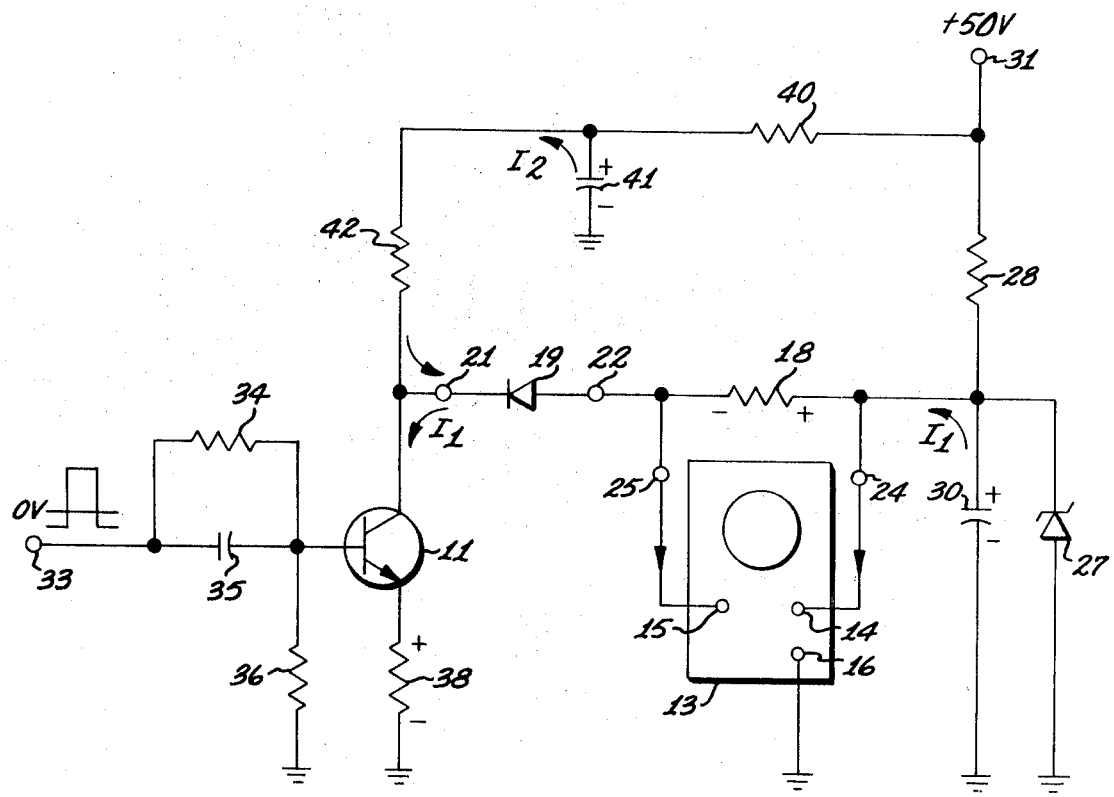
FIG. 1 illustrates a circuit diagram of one embodiment of the present invention.

Referring now to FIG. 1 there is shown apparatus for measuring reverse recovery characteristics of diodes comprising a transistor 11 and an oscilloscope 13. In the illustrative embodiment the transistor is an NPN transistor having an emitter, and a base and a collector. Oscilloscope 13 has first and second vertical signal-input terminals, 14 and 15 respectively, and a ground terminal 16. Any difference between a voltage at vertical terminal 14 and a voltage at vertical terminal 15 causes a vertical deflection in the pattern on the screen of the oscilloscope. The oscilloscope is used to record the current through a resistor 18 which is connected in series with the diode 19 to be tested. The cathode of the diode is connected to a terminal 21 and the anode of the diode is connected to a terminal 22. A pair of signal-output terminals, 24 and 25, are connected to the current-sensing resistor 18. A zener diode 27 and a resistor 28 are connected in series between a +50 v. reference potential and ground to provide a constant value of voltage across the capacitor 30. A source of signal pulses may be connected to the signal-input terminal 33 to cause the transistor 11 to be rendered conductive when diode 19 is being tested.

Resistor 28 and capacitor 30 provide a filtering network so that the value of voltage at the voltage-input terminal 31 remains constant when forward current flows through the diode being tested. In a similar manner resistor 40 and capacitor 41 provide filtering so that the voltage at the terminal 31 does not change when the reverse current through diode 19 is being checked.

Figure 2:
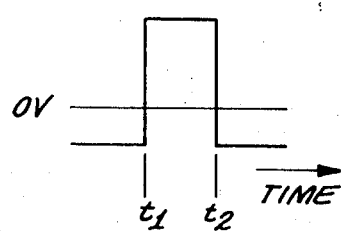
FIG. 2 illustrates a waveform which is useful in explaining the operation of the circuit shown in FIG. 1.

Prior to the time $t_1$ (FIG. 2) the transistor 11 is rendered nonconductive by the signal voltage at the signal-input terminal 33. During this time the capacitor 41 charges to a value of voltage substantially equal to the voltage at terminal 31 in FIG. 1 and capacitor 30 charges to a value of voltage which is determined by the zener diode 27.

At time $t_1$ transistor 11 is rendered conductive so that a forward current $I_1$ flows from the upper plate of capacitor 30 through resistor 18, from anode to cathode of the diode 19, from collector to emitter of transistor 11, through resistor 38 to the lower plate of capacitor 30 thereby providing a voltage of the polarity shown across resistor 18. The voltage across resistor 18 causes an upward deflection in the pattern shown on the screen of the oscilloscope 13. The value of current $I_1$ is determined by the value of the signal applied to signal-input terminal 33. During the time between $t_1$ and $t_2$, when the transistor 11 is conducting, the current $I_1$ causes a slight decrease in the charge on capacitor 30.

At time $t_2$ transistor 11 is rendered nonconductive by the signal at terminal 33. The voltage across capacitor 41 causes a reverse current $I_2$ to flow from the upper plate of capacitor 41 through resistor 42, from the cathode to the anode of diode 19, through resistor 18 to the upper plate of capacitor 30. This reverse current $I_2$ through diode 19, is the result of the charges which were stored in diode 19 and gives a direct indication of the reverse recovery characteristics of the diode 19 which is being tested. Current $I_2$ through resistor 18 gives a voltage of the polarity opposite to that shown across resistor 18 in FIG. 1 and causes a downward deflection in the pattern on the screen of the oscilloscope 13. Thus, both the forward characteristics of the diode 19 and the reverse recovery characteristics of the diode can be seen directly on the screen of the oscilloscope 13. A low value of diode resistance in the reverse direction will also cause a relatively large value of current $I_2$ to flow through the diode being tested. The value of current $I_2$ can also be changed by changing the value of the reference potential at terminal 31 or by changing the value of resistor 42.

The filter circuits comprising resistor 40 and capacitor 41 and the circuit comprising resistor 28 and capacitor 30 provide isolation between the diode being tested and power supply so that spurious signals from the lower supply do not cause a deflection upon the screen of the oscilloscope. If lead between the resistor 42 and the diode 19 and the lead between resistor 18 and the diode are very short the inductance in the leads connected to the diode 19 is low so that spurious signals are not generated in these leads. When large power rectifiers are tested by the instant invention it may be necessary to connect one or more transistors in parallel with transistor 11 so that larger values of current $I_1$ can be provided for checking the characteristics of the power rectifier.

Capacitor 35 and resistor 34 increase the "turn on" and "turn off" speed of transistor 11. At time $t_1$ the signal at terminal 33 is coupled through capacitor 35 so that the transistor 11 is turned on or rendered conductive very rapidly. Between time $t_1$ and time $t_2$ the positive signal voltage at terminal 33 provides a + charge on the left plate of capacitor 35 and a − charge on the right plate of capacitor 35. At time $t_2$ this charge on capacitor 35 provides a voltage which causes transistor 11 to be rendered nonconductive or turned off very rapidly.

While the principles of the invention have now been made clear in an illustrative embodiment, there will be immediately obvious to those skilled in the art many modifications of structure, arrangement, proportions, the elements, materials and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. Apparatus for measuring reverse recovery characteristics of diodes comprising:
   first and second reference potentials;
   first, second, third, fourth and fifth resistors;
   first and second output terminals for providing output signals indicative of said diode characteristics, said first resistor being connected between first potential and said first output terminal, said second resistor being connected between said first and said second output terminals;
   first and second capacitors;
   a zener diode, said zener diode being connected between said first output terminal and said second potential, said first capacitor being connected between said first output terminal and said second potential;
   a transistor having a base, an emitter, and a collector;
   first and second test terminals for receiving said diode to be measured, said first test terminal being connected to said second output terminal, said second test terminal being connected to said collector of said transistor; and
   a signal-input terminal for receiving transistor-activating pulses, said input terminal being coupled to said base of said transistor, said third and said fourth resistors being serially connected between said collector of said transistor and said first potential, said second capacitor being connected between said second potential and a junction between said third and said fourth resistors, said fifth resistor being connected between said second potential and said emitter of said transistor.

2. Apparatus for measuring reverse recovery characteristics of diodes as defined in claim 1 including:
   a signal source having adjustable pulse amplitude, said signal source being coupled to said signal-input terminal.

3. Apparatus for measuring reverse recovery characteristics of diodes as defined in claim 1 wherein:
   the value of said first reference potential is adjustable.

4. Apparatus for measuring reverse recovery characteristics of diodes as defined in claim 1 including:
   a recording device having first and second signal-input terminals, said first signal-input terminal of said device being connected to said first output terminal of said apparatus, said second signal-input terminal of said device being coupled to said second output terminal of said apparatus.

5. Apparatus for measuring reverse recovery characteristics of diodes as defined in claim 1 including:
   an oscilloscope having first and second signal-input terminals, said first signal-input terminal of said oscilloscope being connected to said first output terminal of said apparatus, said second signal-input terminal of said oscilloscope being connected to said second output terminal of said apparatus.

6. Apparatus for measuring reverse recovery characteristics of diodes as defined in claim 1 including:
   a third capacitor; and
   a sixth resistor, said third capacitor and said sixth resistor each being connected between said base of said transistor and said signal-input terminal of said apparatus.

7. Apparatus for measuring reverse recovery characteristics of diodes as defined in claim 1 including:
   an oscilloscope having first and second signal-input terminals, said first signal-input terminal of said oscilloscope being connected to said first output terminal of said apparatus, said second signal-input terminal of said oscilloscope being connected to said second output terminal of said apparatus;
   a third capacitor; and
   a sixth resistor, said third capacitor and said sixth resistor each being connected between said base of said transistor and said signal-input terminal of said apparatus.

* * * * *